United States Patent
McCloskey

(10) Patent No.: US 9,930,826 B2
(45) Date of Patent: Apr. 3, 2018

(54) DATA ACQUISITION SYSTEM FOR A SEED PLANTER

(71) Applicant: Robert Craig McCloskey, North Wiltshire (CA)

(72) Inventor: Robert Craig McCloskey, North Wiltshire (CA)

(*) Notice: Subject to any disclaimer, the term of this patent is extended or adjusted under 35 U.S.C. 154(b) by 45 days.

(21) Appl. No.: 14/999,599

(22) Filed: Jun. 1, 2016

(65) Prior Publication Data
US 2016/0360692 A1 Dec. 15, 2016

Related U.S. Application Data

(60) Provisional application No. 62/230,779, filed on Jun. 15, 2015.

(51) Int. Cl.
*A01C 7/08* (2006.01)
*A01C 5/06* (2006.01)
*A01C 7/10* (2006.01)

(52) U.S. Cl.
CPC .............. *A01C 5/068* (2013.01); *A01C 7/105* (2013.01)

(58) Field of Classification Search
CPC ...................................................... A01C 7/105
See application file for complete search history.

(56) References Cited

U.S. PATENT DOCUMENTS

| | | |
|---|---|---|
| 3,982,671 A | 9/1976 | Curl |
| 4,193,357 A | 3/1980 | Freeman |
| 4,239,010 A | 12/1980 | Amburn |
| 4,243,154 A | 1/1981 | Freeman |
| 5,790,428 A * | 8/1998 | Easton ............... G01B 3/12 702/158 |
| 6,386,128 B1 | 5/2002 | Svoboda et al. |
| 6,626,120 B2 | 9/2003 | Bogner et al. |
| 6,941,225 B2 | 9/2005 | Upadhyaya et al. |
| 7,024,942 B1 * | 4/2006 | Jackson ............... G01N 3/08 73/78 |
| 7,726,251 B1 | 6/2010 | Peterson et al. |
| 8,473,168 B2 | 6/2013 | Goldman et al. |
| 8,948,976 B1 | 2/2015 | Unruh |
| 9,179,595 B2 | 11/2015 | Kormann et al. |
| 2010/0070072 A1 | 3/2010 | Goldmann et al. |
| 2011/0046776 A1 * | 2/2011 | Goldman ............ A01C 7/046 700/225 |

(Continued)

OTHER PUBLICATIONS

H. Sun et al.: "RTK GPS Mapping of Transplanted Row Crops" Computers and Electronics in Agriculture 71(2010) pp. 32-37 by Elsevier.

(Continued)

*Primary Examiner* — Jill Culler
*Assistant Examiner* — Ruben Parco, Jr.
(74) *Attorney, Agent, or Firm* — Mario Theriault

(57) ABSTRACT

The press wheel has instrumentation associated therewith detecting a rolling of the wheel over a planted set. The press wheel also has a computing device connected to the instrumentation and to the speed monitoring device of the planter. The computing device determines spacings between planted sets. The data obtained is real-time data and is readily available to the operator of the planter so that the speed of the planter can be adjusted on the fly to maintain an ideal set spacing.

2 Claims, 7 Drawing Sheets

(56) References Cited

U.S. PATENT DOCUMENTS

| | | | | |
|---|---|---|---|---|
| 2012/0042813 A1* | 2/2012 | Liu | ................... | A01B 79/005 111/149 |
| 2013/0125800 A1 | 5/2013 | Landphair et al. | | |
| 2013/0319307 A1* | 12/2013 | McCloskey | ............. | A01C 9/08 111/152 |
| 2014/0379231 A1* | 12/2014 | Hawes | ................ | B60C 23/0477 701/51 |

OTHER PUBLICATIONS

M. Norremark et al.; "Instrumentation and Method for High Accuracy Geo-Referencing of Sugar Beet Plants" Computers and Electronics in Agriculture 56 (2007) 130-146 / Elsevier.
International Search Report by the PCT Office in a corresponding PCT Application No. PCT/CA2016/000163, dated Aug. 30, 2016.
Written Opinion by the PCT Office in a corresponding PCT Application No. PCT/CA2016/000163, dated Aug. 30, 2016.

\* cited by examiner

DATA ACQUISITION SYSTEM FOR A SEED PLANTER

The present application claims the benefit of U.S. Provisional Application No. 62/230,779, filed Jun. 15, 2015.

FIELD OF THE INVENTION

This invention pertains to recording seed placement in a furrow, and more particularly it pertains to recording real time performance of a seed planting machine.

BACKGROUND OF THE INVENTION

The yield of many crops depends on the exact placement of each seed or set in a furrow. The yield depends on the placement of seeds relative to each other and relative to the geometry of the furrow. For illustration purposes, the examples provided herein refer to potato planting. The problems encountered with potato planting are also found in the planting of other seeds or sets having substantial mass, such as beans and corn. Therefore, the examples given herein do not restrict the present invention to the planting of potato seed pieces. The examples given herein using potato seed pieces are presented herein for convenience to facilitate the understanding of planting problems with other seeds and sets capable of accumulating momentum.

Potato seed pieces are known in the agricultural language as potato sets. A "set" represents any small tuber or part of a tuber, an onion, a corn seed, etc. For convenience, the word "set" is used interchangeably herein with seed and seed pieces, for designating any plant precursor that is planted in the ground for the purpose of producing crops.

Ideal market-size potatoes are the size of a baseball for example and have not been exposed to sunburn along the side of a furrow. The planting of potato sets to obtain an ideal market-size shape must be done at the center of the furrow, and each plant must benefits of sufficient growing space to avoid tuber crowding in the furrow.

Set spacing is also critical to achieve an ideal yield per acre from a field. When the plants are too close to each other, the crop is small. When the plants are too far apart, the yield per acre is low and the crop potatoes may be larger than the ideal market size.

The precise placement of every set relative to the center of a furrow and relative to each other depends on many factors, one of which is referred to herein as "set roll". During potato planting for example, every set is released at a fair speed. It falls into the furrow and rolls until it loses all of its forward momentum. This is called "set roll" or "seed roll". A certain amount of set roll would be acceptable if all the set had the same amount of set roll and would maintain an even spacing there-between. That is not the case, however. In North America, potato growers usually cut their seed potatoes in parts which means that the sets do not have an uniform shape, size and weight, and therefore, not the same ability to roll.

There are other factors that influence the amount of set roll that occurs while planting a crop. The largest of these factors effecting set roll is the speed at which the planter is being pulled forward. The sets in the planter, carry a forward momentum as they are being released from the planter. When the sets hit the ground, they roll in the furrow until the forward momentum is lost. This phenomenon causes the sets to be irregularly spaced from each other. Such irregular spacing is considered as a negative planter performance.

Ideally, the speed of the planter should be adjusted as soon as irregular spacing occurs. That is the purpose of the present invention.

As can be understood, a set roll takes place between the time the sets are released from the planter or seeder and before they are covered over by a furrow closing mechanism such as a coulter, spades, soil amending wheels, etc. Therefore, the exact location of the final resting place of the sets in the ground cannot be accurately predicted.

It is well known that when planting potato sets at speeds exceed 2.5 mph, set roll begins to greatly affect the seed spacings. Despite of this, most potato growers don't operate their planter at such slow speed during planting. Most growers want to take advantage of a sunny and dry period in mid-May usually, to plant their fields as early and as quickly as possible to maximize the number of growing days before harvest. Therefore, a majority of potato growers in Eastern Canada plant their fields at high speeds such as 4, 5 and even 6 mph when planting a Russet-Burbanks™ variety, for example. In a short growing season, a tradeoff is made between maximum growing days and maximum crop yield.

A substantial reduction of "set roll" in potato sets, has been achieved by using a press wheel mounted behind the seed drop chute, and deflectors to project every set in the forward shadow of the press wheel. The press wheel instantly presses each set against the bottom of the furrow to control the rolling motion of that set and to reduce set roll. This arrangement is illustrated herein at FIG. 1, and is described in U.S. Pat. No. 9,258,940 issued on Feb. 16, 2016, to R. Craig McCloskey, the inventor in the present application. This machine is referred to hereinafter as the McCloskey planter.

Despite all the advances in the art, the verification of a planter performance is still done by digging a section of a furrow by hand and hoe, to measure the actual set spacing. This is usually done in the evening when the planting day is over. This is time consuming and introduces a delay in any correction to be made to the planter's speed or to other settings. Using the hand and hoe method, a farmer can only hope to do better the next day.

Besides planting speeds, there are other factors influencing a planter's performance while planting. For example, the seed's physical characteristics, the topography of the field in which the planter is operating, mechanical wear, dirt buildup on planter's surfaces and weather conditions.

As for weather conditions, it is known that the speed of a planter must be reduced in the morning when the soil is relatively moist. Speed can be increased in the afternoon when the soil is somewhat dryer and warmer.

However, a slower planting speed is very expensive in many ways. Reducing speed during planting extends planting season and shortens the growing season. Losing growing days in a limited growing season could be detrimental in reaching a financial breakeven point for a farmer.

Therefore, it is believe that there is a need in this agricultural industry for a method and a system for determining planter performance in real time, such that ideal speed and performance can be continually achieved. There is a need for a method and system to eliminate trials and errors and adjustment delays, associated with the conventional verification method by hand and hoe.

For illustration purposes, the following documents described the work of others in this field.

U.S. Pat. No. 4,239,010 issued to R. D. Amburn on Dec. 16, 1980. This document describes a seed planter having a microwave seed sensor located in the travel path of the seeds, for indicating the passage of seeds along the seed release mechanism.

U.S. Pat. No. 6,626,120 issued to J. Bogner et al. On Sep. 30, 2003. The Bogner document describes a seed planter having seed metering unit and a rotary encoder providing location information for controlling seed planting and spacing and other planted plot data.

U.S. Pat. No. 6,941,225 issued to S. Upadhyaya et al., on Sep. 6, 2005. This document describes a planter using GPS and optical sensors in the seed drop tubes to generate maps of seeds planted.

U.S. Pat. No. 7,726,251 issued to J. R. Peterson et al., on Jun. 1, 2010. The planter described therein has a camera to detect the seed placement and spacing in the furrow.

U.S. Pat. No. 8,473,168 issued to D. M. Goldman et al., on Jun. 25, 2013. The Goldman document describes a seed planter data acquisition system. The planter can detect individual seed dropping from the drop tube and record the coordinates of that seed using a global positioning system (GPS).

U.S. Pat. No. 8,948,976 issued to S. L. Untuh on Feb. 3, 2015. The Untuh document describes a seed planter having a seed meter assembly on the seed plate and a distance measuring instrument to produce a map of seed population in a planted field.

US 2013/0125800 published on May 23, 2013 by D. Landphair et al. This publication also describes a planter using camera to detect seeds in the furrow. As in the Peterson document listed above, the camera detects the seeds in the furrow, whether the seeds are still in movement or not.

Although the seed planters of the prior art deserve undeniable merits, these planters neglect to consider set roll. These prior inventions detect the seeds passing in the drop chute or immediately below the drop chute. The amount of roll of each set and its final resting place in the furrow remain unknown. Therefore, these prior art devices cannot be used to provide a real-time planter performance, such that adjustments can be made on the fly.

Therefore, it is believed that a need exists in the field of seed planter for a system and method to detect in real time, the final resting place of every set in a furrow, such that a planter's speed and other adjustment can be made in real time to maximize acreage planted during each available planting day.

SUMMARY OF THE INVENTION

In the present invention, there is provided a seed planter having a press wheel to check set roll and sensor associated with that press wheel to detect the final resting place of every planted set or seed in a furrow. The signals from the sensors can be used by an operator to adjust the speed of planting or other adjustment on the fly to obtain an ideal planting speed and ideal set spacing.

In one aspect of the present invention, there is provided a press wheel assembly for mounting to a seed planter. This press wheel has instrumentation associated therewith detecting a rolling of the wheel over a planted set. The press wheel also has a computing device connected to the instrumentation and to the speed monitoring device of the planter. That computing device determines spacings between planted sets.

The data obtained is real-time data and is readily available to the operator of the planter so that the speed of the planter can be adjusted on the fly to maintain an ideal set spacing.

In another aspect of the present invention, there is provided a seed planter having a speed monitoring device, a set release mechanism and a press wheel assembly mounted thereto near the set release mechanism. The press wheel assembly comprises a press wheel rolling over planted sets released from the set release mechanism, and checking a set roll in each of these planted sets. The press wheel also comprises instrumentation associated therewith detecting a rolling thereof over a planted set. A computing device is connected to the instrumentation and to the speed monitoring device. The computing device determines a spacing between planted sets.

In another aspect of the present invention, the instrumentation mentioned above includes a pressure sensor to detect a change in air pressure inside the wheel due to deformation of the press wheel when the press wheel rolls over a planted set.

In yet another aspect of the present invention, the press wheel has a flexible and stretchable surface capable of deforming when rolling over a planted set. Electrical switches are mounted under that surface to detect any flexion of that surface. The switches are connected to the computing device which records each occurrence of the wheel rolling over a planted set.

In yet a further aspect of the present invention, there is provided a method for determining exact spacings of planted sets in a furrow. This method comprises the following steps:
rolling a press wheel over planted sets wherein the press wheel has planted-set-detecting instrumentation associated therewith;
using the instrumentation, detecting a passing of the press wheel over each planted set;
relating the step of detecting with a linear speed of the press wheel, and determining spacings between planted sets.

In this method, the press wheel has the double function of checking a set roll in a planted set and determining a position of that planted set. The position obtained from this method is always a last resting place of the planted set in the furrow, after the planted set has lost its forward momentum. The data obtained is believed to be more accurate than the data obtained by other known methods in the prior art.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The drawings presented herein are presented for convenience to explain the functions of all the elements included in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

The planter according to the preferred embodiment of the present invention is also described in term of its operation and the function of its components. The physical dimensions, material types, and manufacturing tolerances are not provided because these details do not constitute the essence of the present invention and would be considered obvious to the skilled artisan having acquired the knowledge that is actually provided in the present document.

Each drawing has been prepared to illustrate a general concept rather that an actual fabrication. Theses drawings were prepared in this format so that they can be extrapolated and easily applied to planters of seeds and sets other than potato sets.

Figure 1:
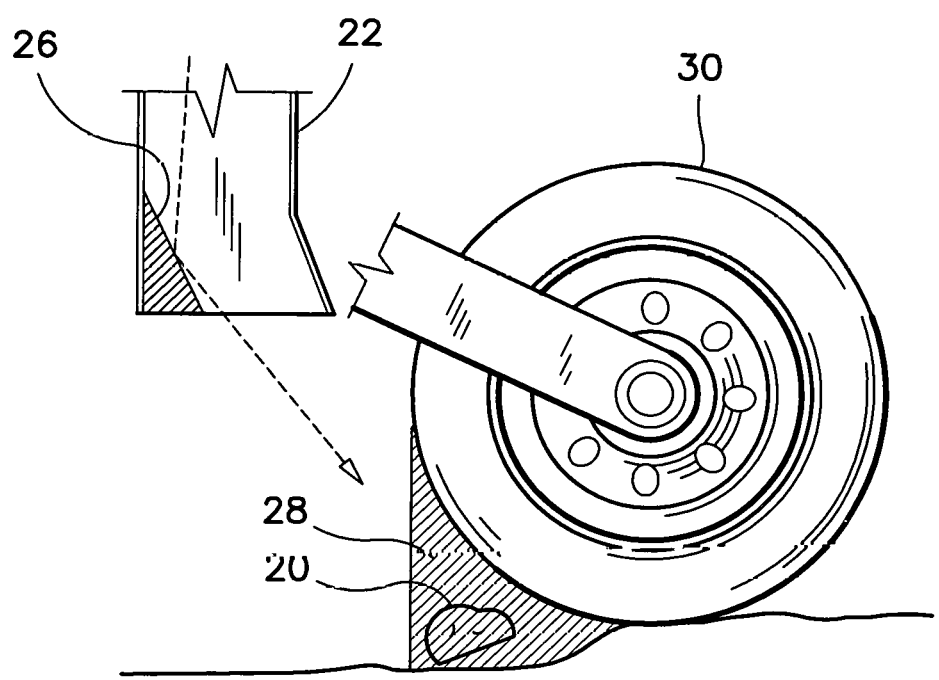
FIG. 1 is a partial side view of a potato set path and delivery under the forward half of a press wheel to reduce set roll, as built in the McCloskey planter.

Referring to FIG. 1, the McCloskey planter is considered the most important advance in the art of reducing set roll when planting sets is illustrated. In the McCloskey planter, a potato set 20 is released from a planter's delivery tower 22. The seed piece or set is deflected against a deflector 26 and projected into the forward shadow 28 of a press wheel 30 rolling over the set, for checking the rolling momentum of the set against the bottom surface of the furrow. The press wheel 30 is preferably mounted on arms and spring loaded against the soil at the bottom of the furrow. This press wheel represents an essential element in the seed planter according to the preferred embodiment of the present invention.

Referring to FIGS. 2-5, a partial view of the planter according to the preferred embodiment of the present invention is illustrated. The preferred seed planter has a relatively wide furrow opening shoe 40. The furrow opening shoe is made of a cutting edge 42, abrasive-resistant opening plates 44 bordering the cutting edge and wings 46 for widening and lapping the bottom of the furrow.

Figure 3:
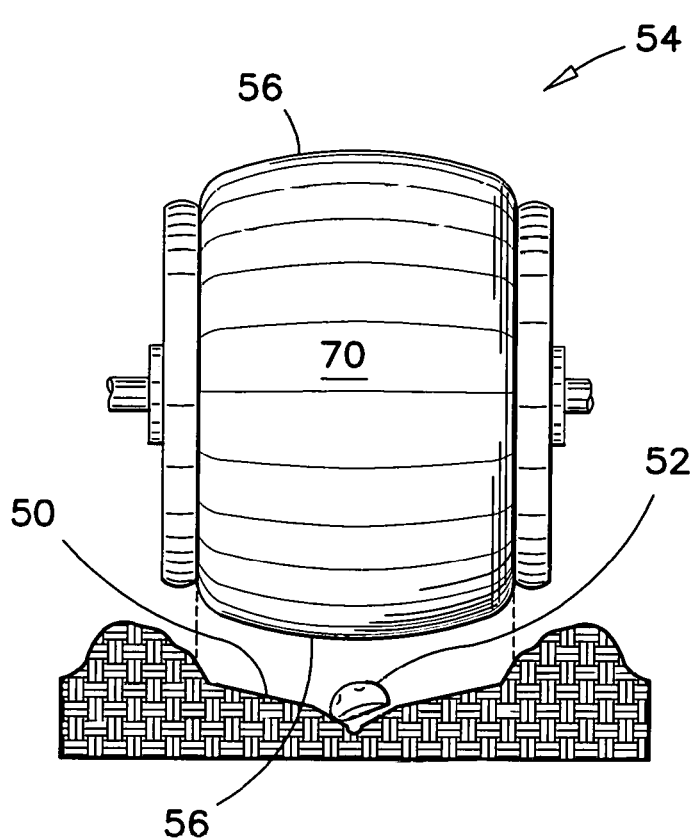
FIG. 3 is a partial cross-section view the furrow made by the preferred planter and a front view of the press wheel in the preferred planter.
Figure 4:
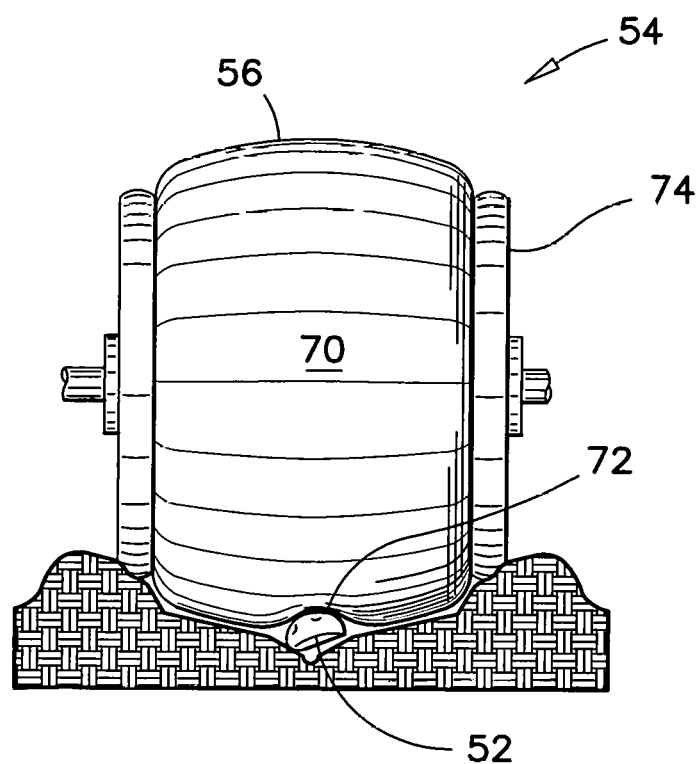
FIG. 4 is an illustration of a press wheel rolling over a potato set.

The preferred shape of the furrow is illustrated by label 50 in FIG. 3. The preferred shape 50 of the furrow has a smooth and even surface that can receive a seed piece or set 52. The bottom surface of a furrow, generally, is sufficiently hard to receive a set and supporting that set above the soil. The bottom surface of a furrow is sufficiently hard so that a set in that furrow represents a detectable object when rolling a press wheel 54 over the surface of that furrow. In FIG. 3, the press wheel 54 has been lifted up the surface of the furrow for clarity. In use, the surface 56 of the press wheel 54 preferably touches the surface of the bottom of the furrow over the entire width of the press wheel 54 as can be understood from FIG. 4.

Referring back to FIG. 2, the planter according to the preferred embodiment of the present invention, has deflectors 60 to deflect the trajectories 62 of sets toward a region under the forward half of a press wheel 54 mounted to the planter between the seed delivery tower 64, and a pair of furrow closing discs 66. It will be appreciated that the seed delivery tower 64 has of a double column configuration, delivering sets side-by-side in an alternating mode. The potato sets are released in a left-right-left mode, to improve on the efficiency of the planter. For this reason, the deflectors 60 and trajectories 62 referred to above are plural. In this drawing, both deflectors and both trajectories are superimposed over each other.

Figure 2:
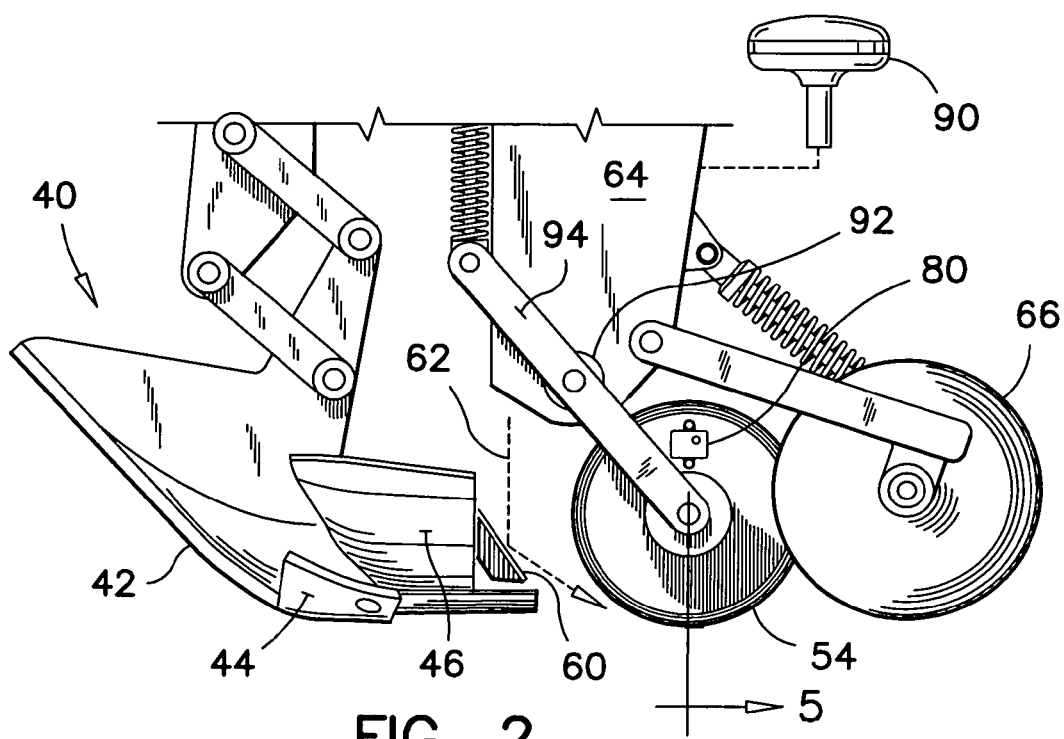
FIG. 2 is a partial side view of the preferred planter according to the preferred embodiment of the present invention.

In the illustration of FIG. 2, it will be appreciated that both deflectors 60 are angled inward to project potato sets in a single row. This placement of the deflectors 60 is a standard mounting on a double column potato planter.

The press wheel 54 in the planter according to the preferred embodiment of the present invention has an inflated tire 70 thereon. The tire 70 is a balloon type tire and the inflation is such that the surface thereof is flexible, soft and smooth. The degree of flexibility of the tire is such that the wheel 54 can roll over a set 52, flex and stretch to make an imprint 72 of the set in the surface 56 of the wheel without damaging the set. The press wheel 54 preferably has dust covers 74 on each side thereof.

Figure 5:
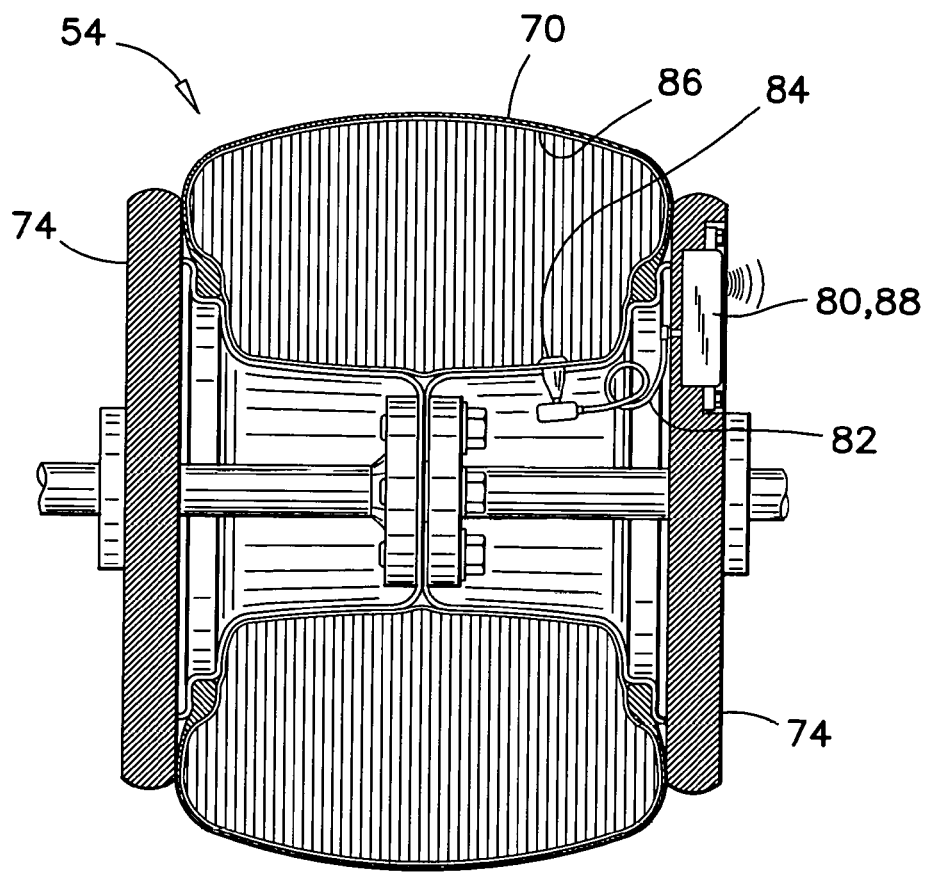
FIG. 5 is a cross section view of the press wheel in the preferred embodiment, as seen along line 5 in FIG. 2.

Referring now to FIGS. 2 and 5, the press wheel 54 has pressure-detecting instrumentation 80 mounted therein. In the preferred embodiment, the pressure-detecting instrumentation 80 includes a connection 82 to the valve stem 84 of a tube 86 mounted inside the tire 70. It will be appreciated that a tubeless tire may also be used.

The pressure-detecting instrumentation 80 is mounted inside a sealed compartment 88. This compartment 88 is preferably mounted to, or encased in the dirt cover 74 of the wheel 54. The pressure-detecting instrumentation 80 monitors the internal air pressure of the tire 70 through the connection 82 to the valve stem 84. The sensitivity of the instrumentation is sufficient to detect a set making an imprint 72 on the surface 56 of the press wheel 54 when the press wheel 54 rolls over that set.

The pressure-detecting instrumentation 80 also include a transmitter to transmit a wireless signal to a receiver and a computer.

In use, the wireless signal is transmitted to the computer which records every occurrence of the press wheel rolling over a set. This signal is associated with the speed of the planter, by the computer, to determine a real-time spacing between the sets.

This real-time spacing of the sets can be used by an operator to regulate the speed of the planter, on the fly, to take advantage of good and dry soil condition, for example. This real-time spacing signals can also be used by an operator to reduce the speed of the planter when the spacing of planted sets starts to deviate from an ideal value. The real-time spacing can be used by an operator to operate a planter at its maximum performance at all times and under all field conditions. This set spacing data obviates the need for the conventional manual set-spacing verification method mentioned before.

The seed planter according to the preferred embodiment of the present invention preferably has a global positioning system (GPS) transmitter/receiver 90 mounted thereon. The signal from this GPS 90 is advantageously added to the instrumentation mentioned above to compute other valuable data.

In the planter according to the preferred embodiment of the present invention, an encoder 92 is mounted on the swing arm of the press wheel 54 to establish a relation between the lower surface of the press wheel 54 and the location of the GPS 90 on the machine. The information collected by the GPS system 90 is combined to the pressure signal mentioned above and to the speed of the planter to determine the X-Y-Z coordinates (longitudinal, lateral, and depth) of every seed planted.

Figure 6:
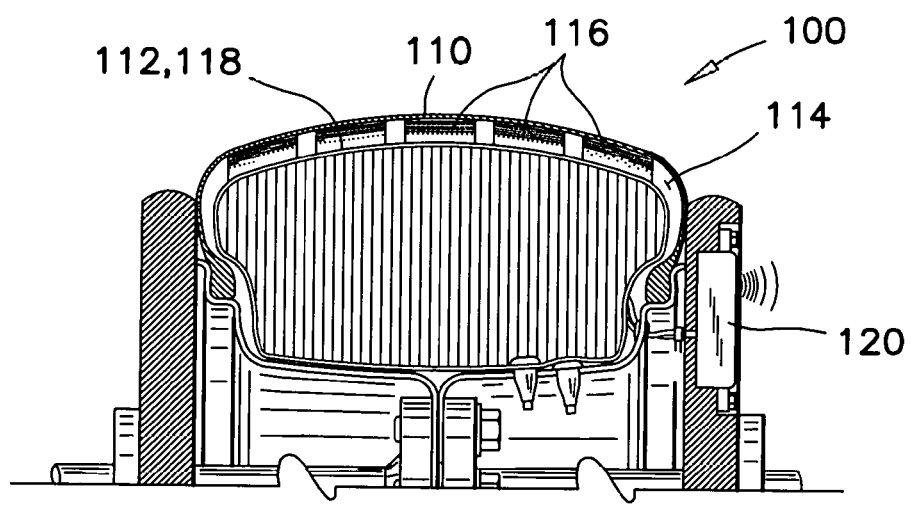
FIG. 6 is a partial cross-section view of a first alternate press wheel in the planter according to the preferred embodiment.

Referring now to FIG. 6 an alternate press wheel 100 is partly illustrated therein. This particular press wheel 100 has two inflatable chambers therein. The wheel has a tubeless tire 110 and a tube 112 mounted inside the tubeless tire 110. Both the tube 112 and the tire 110 are inflated such that a space 114 is maintained between the tube 112 and the inside surface of the tire 110. It will be appreciated that the tire 110 is also a balloon-type, flexible and stretchable tire as described before, capable of deforming over a set without bruising or damaging the set.

The inside surface of the tire 110 has several strips 116 of flexible metallic foil bonded thereto. The outside surface of the tube has a flexible metallic coating 118 thereon. The metallic coating 118 and the foil strips 116 are electrically connected to a circuit inside a signal transmitting compartment 120 mounted to the dirt cover 74 of the wheel 100.

When the press wheel 100, according to the preferred embodiment rolls over a set. The surface of the tire is deflected, causing one of the foil strips 116 to come in contact with the metallic coating 118 of the tube 112, and sending an electric signal to the signal transmitting instrumentation. This signal is recorder by a computer to record the placement of every set along and across the furrow.

Figure 7:
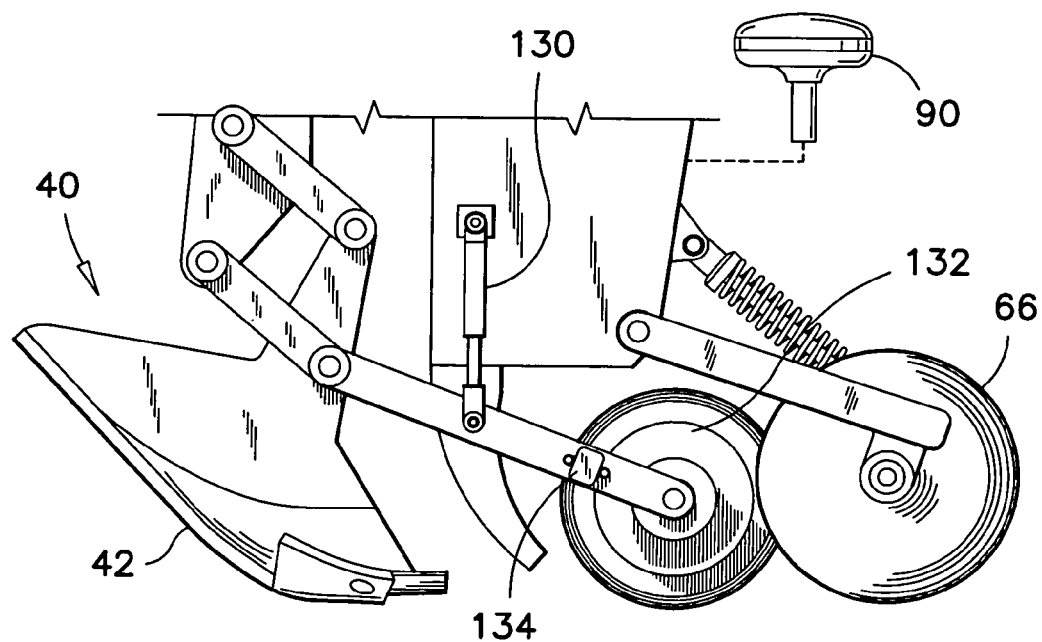
FIG. 7 is a side view of a small seed planter.

It will be appreciated that a number of other devices can also be used in association with a press wheel to determine the exact position of a seed in a furrow. As a first example, a position sensor 130 is mounted on one of the arms supporting the press wheel 132 such as illustrated in FIG. 7, to detect an upward displacement in the press wheel 132. This position sensor 130 may be a linear encoder or a pressurized cylinder in which a change in pressure can be measured.

Figure 8:
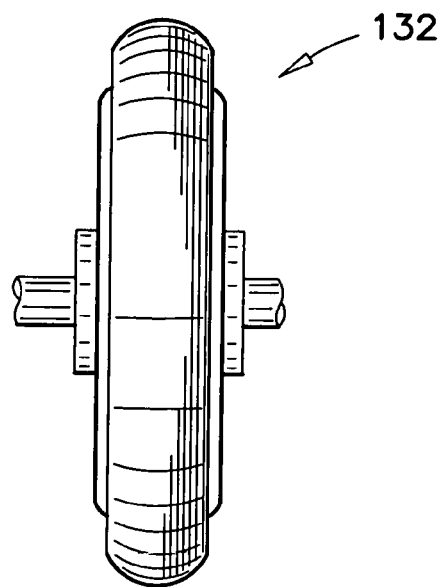
FIG. 8 is a front view of the preferred wheel in the small seed planter.

The press wheel 132 as illustrated in FIG. 8 is relatively narrow wheel for use in planting small hard seeds such as corn and bean seeds. The wheel is preferably made of thin metal and hollow. A detectable pinging sound of the wheel 132 rolling over a seed is recorded and related to seed location. Alternatively, a vibration in the wheel can be detected and associated with seed location. In the example of FIG. 7, an encoder 134 is mounted to the arm supporting the press wheel 132 for associating an angular position of the wheel to every ping noise heard from the wheel, and for calculating seed spacing.

In yet other examples, proximity detectors can be used in association with the press wheel; pressure sensitive mats such as those used in gait analysis can be used in a wrapped-around mode around the press wheel or immediately under the flexible outer layer of the tire 70 to record impacts of the wheel against seed pieces. When a gait analysis mat is used, it can be used with an encoder 134 on the press wheel axle to determine an exact set placement relative to the lowermost point on the wheel.

The possibilities listed above represent only a few examples, as still other equipment can be used in association with a press wheel to detect the position of a set after a momentum of that set has been depleted.

Figure 9:
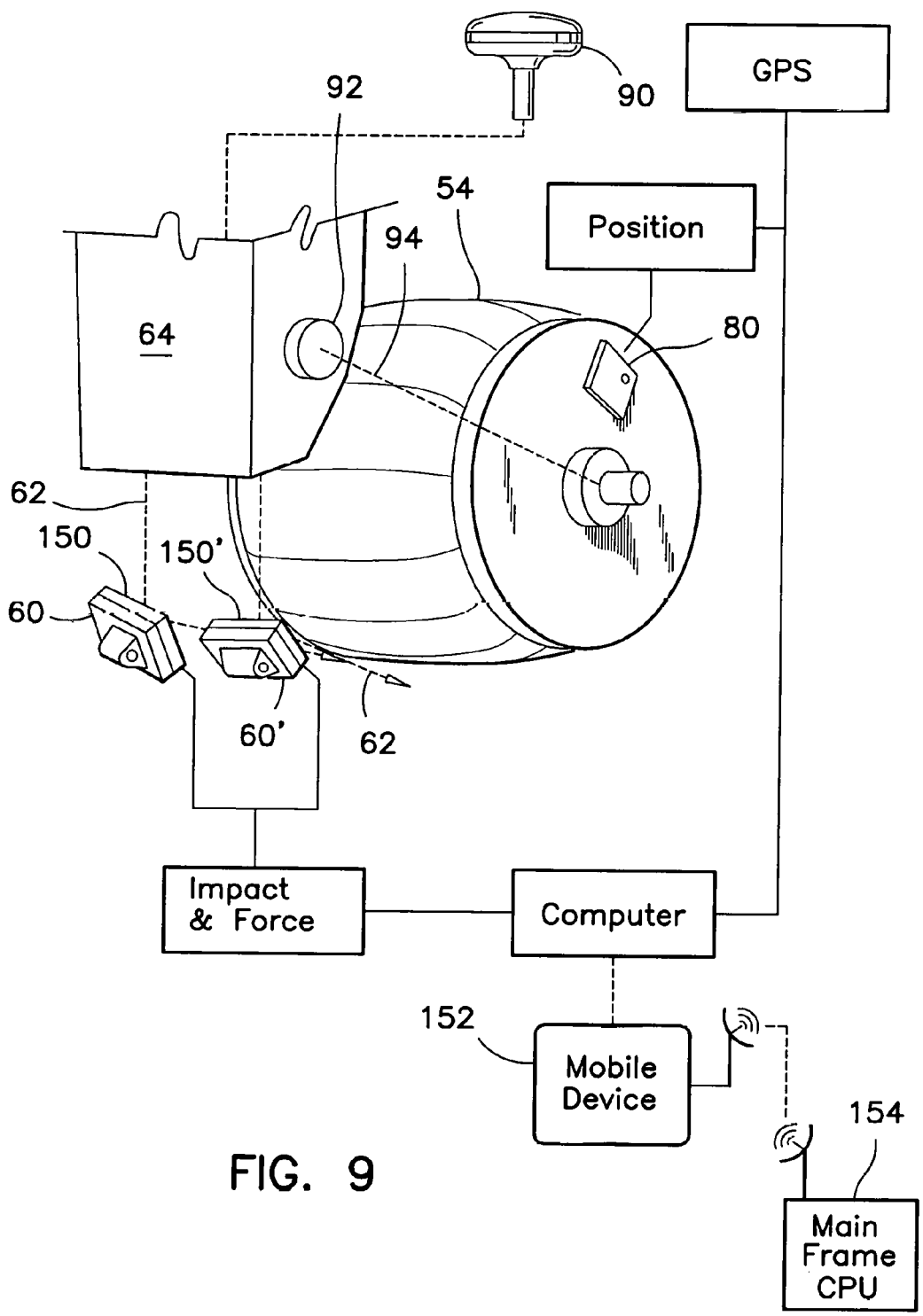
FIG. 9 is a partial perspective view of optional instrumentation in the planter according to the preferred embodiment of the present invention.

Referring now to FIG. 9, there is illustrated therein a seed planter according to the preferred embodiment with optional additional instrumentation. This optional instrumentation includes impact sensors 150, 150' mounted on the deflecting surfaces of the deflectors 60, 60'. The impact sensors measure the force of the impact from a set bouncing off one of the deflectors. The optional instrumentation also a pressure sensor 80 as mentioned previously, and a GPS 90. The impact sensors 150, 150' are connected to a computer. The computer records the impacts of the sets against the deflectors, the impact forces of the sets, and the time of the impacts of the sets hitting each deflector 60, 60'.

The information obtained from the instrumentation mentioned herein above can be displayed on a monitor 152 to the operator of the planter in a format that indicates planter's performance. This information is also preferably transmitted to a main computer 154 in the farmer's office for example. Of course, the planter's performance data can also be displayed on a mobile communication device 154 using an app.

The following data constitute a partial list of the information available from the instrumentation described above:

to measure real-time seed spacing;
to measure set roll consistency;
to detect seed misses (empty release);
to detect double seed releases;
to calculate total seed weight planted;
to determine locations of the seed pieces across the width of the furrow;
to detect efficiency of the seed delivery tower and deflectors;
to measure performance and consistency of the planter;
to generate maps of seed locations;
to generate maps of planting speeds;
to generate maps showing the topography of a field.

Figure 10:
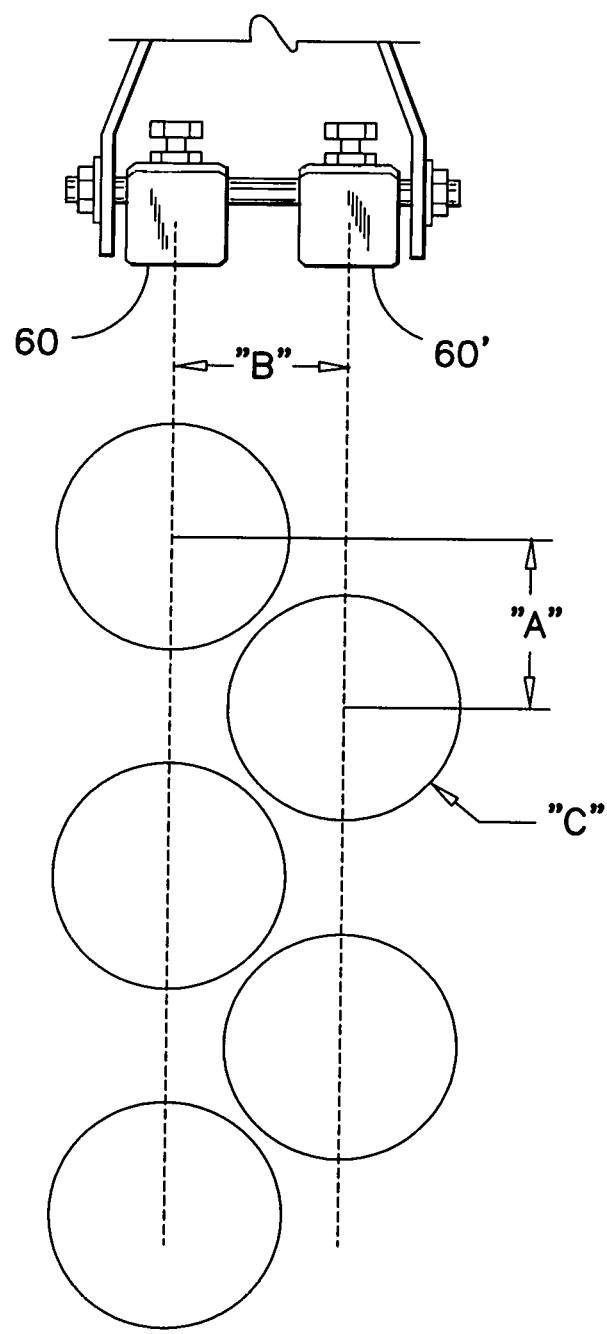
FIG. 10 is a partial plan view of a double row furrow that can be advantageously planted using the planter according to the preferred embodiment.

One possible application for the optional instrumentation described above is illustrated in FIG. 10. In this drawing, there is illustrated a plan view of a double row, or staggered planting method. In this application, both deflectors 60, 60' are oriented to deflect seeds in two spaced apart parallel rows. The longitudinal distance "A" as well as the lateral distance "B" between plants can be monitored to ensure that each plant has a minimum growth area "C" for minimizing tuber crowding.

Modern seed planters can make a relatively large furrow with a smooth surfaced bottom. Although double row or staggered planting is not well known in the industry, it is believed that this method of planting has many advantages over the single row method. The planting potato seed pieces for example, in a staggered arrangement along a single row is made to respect an ideal foot print for each plant, while reducing the longitudinal spacing between adjacent plants. In some cases, the longitudinal spacing of planted sets along a furrow can be reduced by 30%, while maintaining the same foot print for each plant. The soil usage in a potato field is thereby improved. Yield per acre is also increased.

It is believed that staggered planting will be more appreciated in the future, with the advance of precision agriculture and the use of press wheels on seed planters.

Another benefit from the data obtained from this optional instrumentation include the matching of data collected from the planter with aerial images monitoring actual plant growth. Aerial images of a potato field during the plant growing season can be compared to maps of seed weight, seed piece spacings, seed placement accuracy, or maps of planting speeds, to associate plant growth to the best planting conditions. The information derived from this matching of maps can be used to formulate corrective actions for future planting. It is also believed that the data collected from the instrumentation mentioned herein will become more and more valuable as precision agriculture continue to progress.

What is claimed is:

1. A method for determining exact spacings of planted sets in a furrow, comprising the steps of:
   rolling a press wheel over said planted sets wherein said press wheel has planted-set-detecting instrumentation associated therewith;
   using said instrumentation, detecting a contact of said press wheel with each of said planted sets;
   relating said step of detecting with a speed of said press wheel, and determining spacings between said planted sets.

2. The method as claimed in claim 1, further including the step of:
   relating said step of detecting to GPS coordinates, and recording said GPS coordinates.

* * * * *